Nov. 12, 1929.  F. W. ROLLER  1,735,092
TRANSFORMER
Filed Sept. 18, 1925
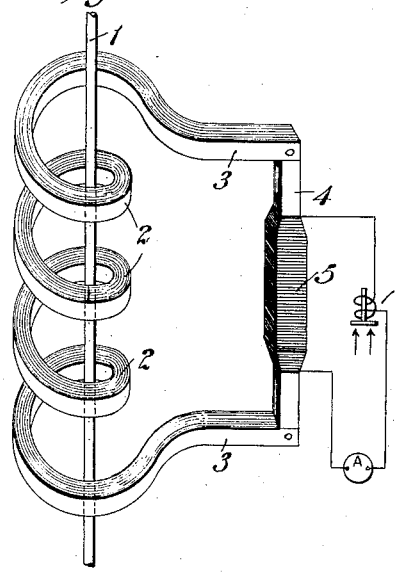
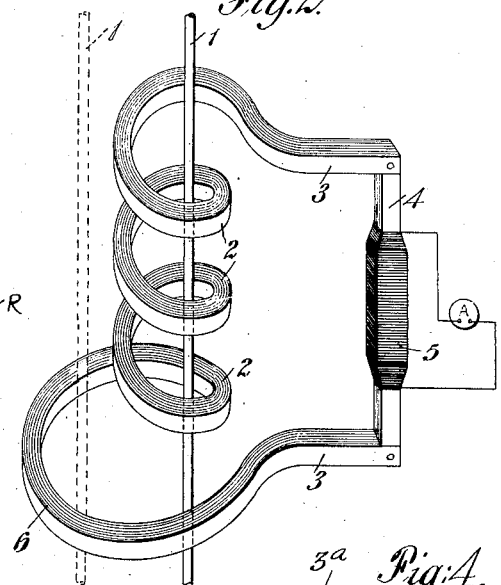
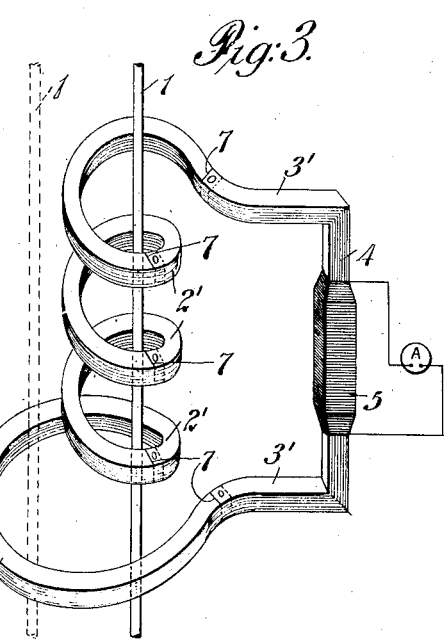
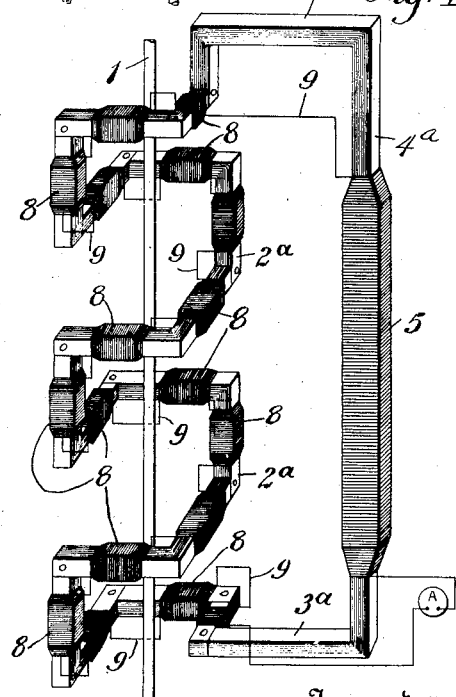
Inventor
Frank W. Roller
By his Attorneys
Edwards, Sager & Bower.

Patented Nov. 12, 1929

1,735,092

UNITED STATES PATENT OFFICE

FRANK W. ROLLER, OF EAST ORANGE, NEW JERSEY

TRANSFORMER

Application filed September 18, 1925. Serial No. 57,074.

This invention relates to transformers and particularly to that class of transformers where special conditions make it desirable to use a single turn in the primary or secondary winding. One example of such a transformer is the series transformer commonly used in connection with measuring instruments or relays, where transformation of current value is desirable for the purpose of reducing it to a value that may be more conveniently supplied to a measuring instrument, also where it is desirable to insure better insulation of the instrument from the supply circuit, and also in cases where it is desirable to locate the measuring instrument at some distance from the primary or supply circuit. In such cases it is advantageous from practical considerations, to have one of the transformer circuits take the form of a straight conductor or rod instead of a winding, or in some instances the primary or secondary circuit of the transformer may be in the form of a single loop.

As a special example, it may be mentioned that where the current flowing in an alternating circuit is of considerable magnitude, such as 500 amperes or more, and a series transformer is used in connection with an instrument for measuring the current, the primary of the transformer carrying the large current is in the form of a straight bar or conductor. In such cases the flux caused to pass through the magnetic circuit of the transformer is adequate for practical purposes with 500 or more amperes passing through such a conductor. But where the primary circuit current to be measured is less than a certain value, say for example, 500 amperes, the straight conductor, or single turn effect thereof as a primary winding, is inadequate to obtain desired accuracy of current measurement. This difficulty may be overcome by causing the primary conductor to have a plurality of turns, but this introduces disadvantages in construction and fails to obtain the convenience of using a single turn or straight bar conductor.

By the present invention, the use of a single turn effect, or straight bar conductor, in the primary or secondary of a transformer, is made permissible even where the current passing therethrough is much less than has been used before with a single turn, or straight bar, winding. For example, in the series transformer for use with measuring instruments, relays, regulators and the like, it becomes practical by use of this invention to use a primary with current therein of very much less value than has previously been practical. This is accomplished by providing a magnetic core of an improved form in a novel relationship to the single turn or straight bar conductor forming the primary.

The invention will be understood from the following description and accompanying drawings, in which Fig. 1 is a perspective view, and partly diagrammatic, illustrating one embodiment of this invention, and Figs. 2, 3 and 4 are similar views of modifications.

Referring to Fig. 1 the transformer illustrated is of the series type and the primary, carrying the current to be measured or utilized by transformation for controlling relays, regulators and the like, is indicated as a straight bar conductor 1. The magnetic core is made up of laminæ, but instead of being of the various forms heretofore used, it is provided with a plurality of magnetic core turns in series with each other, and these series of magnetic turns are related to the conductor 1, so as to produce a cumulative magnetic effect in the core. In Fig. 1 the magnetic core is illustrated as having a plurality of turns 2 in series with each other and enveloping the conductor 1, and having extensions 3 connected to a straight core portion 4. The leg 4 of the transformer core is shown as extending through the secondary winding 5, from which the terminals lead to ammeter A and a relay R. Evidently any other device may be connected in the secondary circuit as desired to meet particular purposes or requirements. The transformer core is, of course, made of laminations of transformer sheet iron or steel; and in the form shown in Fig. 1 the turns 2 and extensions 3 are shown as made of thin strips formed into a spiral shape and bent flatwise. This spiral shape of core may be formed by winding the sheets or ribbons on a suitable mandrel, either after the sheets or ribbons have been assembled, or during the assembly of the sheets, depending upon the size of the transformer. The ends of the extensions 3 are preferably interleaved with the ends of the laminæ of the leg 4, or otherwise brought into suitable magnetic contact.

When current passes through the conductor 1, it is evident that it will cause a magneto-motive force to be created in the transformer core equal to the sum of the magneto-motive forces set up in each of the magnetic core turns around the conductor 1. Thus with comparatively low current values in the conductor 1 the magneto-motive forces and flux created in the magnetic core will be sufficient to secure the required effect upon the secondary winding and give satisfactory performance. If it be assumed, for example, that the limiting minimum capacity is 500 amperes for certain purposes when utilizing a straight conductor primary with the usual transformer core, it becomes possible with this invention to obtain satisfactory results when 100 amperes are flowing through the primary conductor by forming the magnetic circuit so as to constitute five turns in series around the conductor 1. Obviously, the ammeter A when used can be calibrated to read directly the amperes passing in conductor 1, and any regulators or relays in the secondary circuit may obviously be adjusted to give the desired results according to the current passing in conductor 1.

Fig. 2 is similar to Fig. 1 except that it is modified to have an enlarged magnetic turn 6 of the magnetic core in series with the magnetic turns 2 for the purpose of adapting the transformer and ammeter in the secondary to measure current over a wide range of values, and which may be used as desired for measuring current, either of very large amounts or current of considerably smaller range of values. With this form of construction, when the conductor 1 passes through all the loops of magnetic turns, the transformer and ammeter A are adapted to measurement of currents of comparatively small range, but when the conductor 1 is passed through the loop or turn 6 alone, as indicated by dotted lines, and does not pass through the turns 2, then the transformer and ammeter are adapted to measure currents of a much higher range of values. Evidently, the number of magnetic turns in series enveloping the conductor 1 in its different positions may be varied to obtain any desired range of transformation ratios, according to the number of magnetic turns in series with each other, and according to the diameter given to the different number of turns in relation to each other.

Instead of forming the magnetic turns of strips or ribbons wound flatwise as in Figs. 1 and 2, the magnetic sheets or strips may be laminated in planes at right angles to those illustrated in Figs. 1 and 2. In Fig. 3 the general relationship of the parts is the same as in Fig. 2 except that the turns of the magnetic core are laminated edgewise, the turns 2' and 6' and the extensions 3' being so shown in Fig. 3. In some cases this form of core may be made up of continuous strips wound edgewise on a suitable mandrel, or built up of stampings of curved form and then bent in spiral form and assembled by building up the core to its final form. The joints between the spiral strips when the core is thus assembled of curved stampings is indicated by the numeral 7 in Fig. 3.

In Fig. 4 another form of core construction is illustrated, as well as a different location of the secondary windings. Here the magnetic core turns instead of being formed in a curved or spiral shape are built up of rectangular strips to form the turns 2ᵃ having a series of short lengths at right angles to each other enveloping the conductor 1, and joined at their ends with the straight leg 4ᵃ.

Evidently magnetic leakage will occur between adjacent core turns in the various forms illustrated. Where the transformer is to be used in connection with an ammeter to indicate primary current values, this leakage is not objectionable. When, however, this invention is applied to transformers for use in instances where it is desirable to decrease the effect of this leakage factor, the secondary winding instead of being wound merely upon the leg 4 of the core, may be applied to the core so as to surround the core convolutions. In the forms of core shown in Figs. 1, 2 and 3, the secondary winding may be made in the form of a helix, flexible if desired, and threaded into place over the core convolutions. In the form shown in Fig. 4, the secondary windings, when it is desired to apply them to the core convolutions, may be made in the form of a series of short coils 8 placed upon the short legs making up the core turns and connected together as indicated at 9 in Fig. 4.

Although I have shown and described various embodiments of this invention, it is evident that this invention may be embodied in various forms of construction and various other applications thereof may be made without departing from the scope of the claims. Also in some cases the single straight bar, or single turn conductor may be the secondary of the transformer instead of the primary. Also the core, instead of being made up of iron or steel sheets, may be made up of iron or steel wires.

I claim:

1. A transformer core comprising a plurality of magnetic turns connected in series, and a leg connecting the ends of said magnetic turns.

2. A transformer having a core, said core comprising a plurality of magnetic turns in series with each other, and primary and secondary current carrying elements, one of said elements passing through said magnetic turns and the other of said elements enveloping a portion of the core.

3. A transformer having a core, said core comprising a plurality of magnetic turns connected in series with each other, and primary and secondary elements, one of said elements comprising a single conductor passing through said turns, and the other of said elements comprising a plurality of turns enveloping a portion of said core.

4. A transformer having a core, said core comprising a plurality of magnetic turns connected in series with each other, and primary and secondary elements, one of said elements comprising a straight conductor passing through said magnetic turns, and the other of said elements comprising a plurality of turns around a portion of said core.

5. A transformer having a core, said core comprising a plurality of magnetic turns connected in series with each other, and primary and secondary elements, certain of said magnetic turns being different from other of said magnetic turns and adapted to have one of said elements pass through a different number of magnetic turns when in one position of said element than when in another position of said element.

6. A transformer having a core, said core comprising a plurality of magnetic turns connected in series with each other, certain of said turns being of a different size from other of said turns, and primary and secondary elements, one of said elements passing through a different number of said turns when in one position than when passed through in another position.

7. A transformer having a core, said core comprising a plurality of magnetic turns connected in series with each other, a primary element and a secondary element, said magnetic turns having a generally spiral form embracing one of said elements.

8. A transformer having a core, said core comprising a plurality of magnetic turns connected in series with each other, a primary element and a secondary element, said magnetic turns having a generally spiral form embracing one of said elements, said spiral turns being laminated and extending flatwise around said last named element.

9. A transformer having a core, said core comprising a plurality of magnetic turns connected in series with each other, a primary element and a secondary element, said magnetic turns having a generally spiral form embracing one of said elements, said spiral turns being laminated and extending edgewise around said last named element.

10. A transformer having a core, said core comprising a plurality of magnetic turns connected in series with each other, and primary and secondary elements, one of said elements passing through said turns, and said turns comprising a series of short straight portions at right angles to each other.

11. A transformer having a core, said core comprising a plurality of magnetic turns connected in series with each other, and primary and secondary elements, one of said elements passing through said turns, and said turns comprising a series of short straight portions at right angles to each other, said portions being formed of rectangular laminations.

12. A transformer comprising a core, said core comprising a plurality of magnetic turns connected in series with each other, and primary and secondary elements, one of said elements passing through said turns and the other of said elements located on and passing around said magnetic turns.

13. A transformer having a core, a primary current carrying element and a secondary current carrying element, said core comprising a plurality of magnetic turns in series relation with each other and enveloping the primary current carrying element.

14. A transformer having a core, a primary current carrying element and a secondary current carrying element, said core being laminated and having a plurality of magnetic turns in series with each other and enveloping the primary current carrying element.

15. A transformer having a core, a primary current carrying element and a secondary current carrying element, said core comprising a plurality of magnetic turns connected in series enveloping the primary current carrying element, and a leg connecting the ends of said magnetic turns.

FRANK W. ROLLER.